US011310578B2

(12) United States Patent
Kleinheincz et al.

(10) Patent No.: US 11,310,578 B2
(45) Date of Patent: Apr. 19, 2022

(54) WATER AND DUSTPROOF EXTERNAL MICROPHONE APPARATUS

(71) Applicant: Harman International Industries, Incorporated, Stamford, CT (US)

(72) Inventors: Zoltan Giang-Son Kleinheincz, Pilisborosjeno (HU); Zsolt Marton, Budapest (HU); Laszlo Csaszar, Budapest (HU); Pablo Diego Regla, Budapest (HU); Balazs Varga, Szekesfehervar (HU); Viktor Dobos, Budapest (HU)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/799,010

(22) Filed: Feb. 24, 2020

(65) Prior Publication Data

US 2020/0280782 A1 Sep. 3, 2020

Related U.S. Application Data

(60) Provisional application No. 62/812,096, filed on Feb. 28, 2019.

(51) Int. Cl.

*H04B 1/00* (2006.01)
*H04R 1/08* (2006.01)
*H04R 1/04* (2006.01)

(52) U.S. Cl.

CPC ............... *H04R 1/086* (2013.01); *H04R 1/04* (2013.01); *H04R 2410/07* (2013.01); *H04R 2499/13* (2013.01)

(58) Field of Classification Search

CPC .......... H04R 1/086; H04R 1/04; H04R 1/222; H04R 1/342; H04R 2410/07; H04R 2499/13

(Continued)

(56) References Cited

U.S. PATENT DOCUMENTS

2008/0238112 A1* 10/2008 Eberlein ............. B60R 13/0206 292/262
2016/0234594 A1* 8/2016 Ogura ..................... E05F 15/70
2019/0149934 A1* 5/2019 Fischer ................ H04R 1/2823 381/56

FOREIGN PATENT DOCUMENTS

EP 2565600 A1 3/2013
EP 2566183 A1 3/2013

(Continued)

OTHER PUBLICATIONS

Extended European Search Report for Application No. 20159659.0, dated Jul. 17, 2020, 9 pgs.

(Continued)

*Primary Examiner* — Katherine A Faley

(74) *Attorney, Agent, or Firm* — Brooks Kushman P.C.

(57) ABSTRACT

In at least one embodiment, a microphone apparatus for attachment to an exterior portion of a vehicle is provided. The apparatus includes a printed circuit board (PCB), a microphone element, a cover, and a grille cover. The microphone element is positioned on the PCB. The cover extends over the printed circuit board and defines a first opening to enable ambient sound external to the vehicle to be transmitted to the microphone element. The grille cover is positioned on the exterior portion of the vehicle defining a plurality of openings for directly receiving the ambient sound and for transmitting the ambient sound to the first opening of the cover and to the microphone element.

12 Claims, 4 Drawing Sheets

(58) Field of Classification Search
USPC .......................................................... 381/86
See application file for complete search history.

(56) References Cited

FOREIGN PATENT DOCUMENTS

| | | | |
|---|---|---|---|
| EP | 3059125 | A1 | 8/2016 |
| JP | S6148210 | A | 3/1986 |

OTHER PUBLICATIONS

European Office Action for Application No. 20159659.0 filed Feb. 27, 2020, dated Feb. 4, 2022, 7 pgs.

* cited by examiner

WATER AND DUSTPROOF EXTERNAL MICROPHONE APPARATUS

CROSS-REFERENCE TO RELATED APPLICATIONS

This application claims the benefit of U.S. provisional application Ser. No. 62/812,096, filed Feb. 28, 2019, the disclosure of which is hereby incorporated in its entirety by reference herein.

TECHNICAL FIELD

Aspects disclosed herein generally related to an external microphone apparatus. In one example, the external microphone apparatus is arranged to withstand environmental conditions that are present external to a vehicle. These aspects and others will be discussed in more detail below.

BACKGROUND

Microphones may need to be packaged on an exterior portion of an automobile to support and number of vehicle applications to detect sound outside to the vehicle. Such microphones may need to be impervious to various environmental conditions such as wind, rain, snow, etc. Additionally, such microphones may be positioned on "Class A" surfaces of the vehicle exterior and should provide an appealing aesthetic appearance for vehicle occupants to accentuate the exterior styling of the vehicle.

SUMMARY

In at least one embodiment, a microphone apparatus for attachment to an exterior portion of a vehicle is provided. The apparatus includes a printed circuit board (PCB), a microphone element, a cover, and a grille cover. The microphone element is positioned on the PCB. The cover extends over the printed circuit board and defines a first opening to enable ambient sound external to the vehicle to be transmitted to the microphone element. The grille cover is positioned on the exterior portion of the vehicle defining a plurality of openings for directly receiving the ambient sound and for transmitting the ambient sound to the first opening of the cover and to the microphone element.

In at least another embodiment, a microphone apparatus for attachment to an exterior portion of a vehicle is provided. The apparatus includes a microphone element, a cover, and a grille cover. The cover extends over the microphone element and defines a first opening to enable ambient sound external to the vehicle to be transmitted to the microphone element. The grille cover is positioned on the exterior portion of the vehicle and defines a plurality of openings for directly receiving the ambient sound and for transmitting the ambient sound to the first opening of the cover and to the microphone element.

In at least another embodiment, a microphone apparatus is provided. The apparatus includes a microphone element, a cover, and a grille cover. The cover extends over the microphone element and defines a first opening to enable ambient sound external to a vehicle to be transmitted to the microphone element. The grille cover is positioned on a bumper of the vehicle and defines a plurality of openings for directly receiving the ambient sound and for transmitting the ambient sound to the first opening of the cover and to the microphone element.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
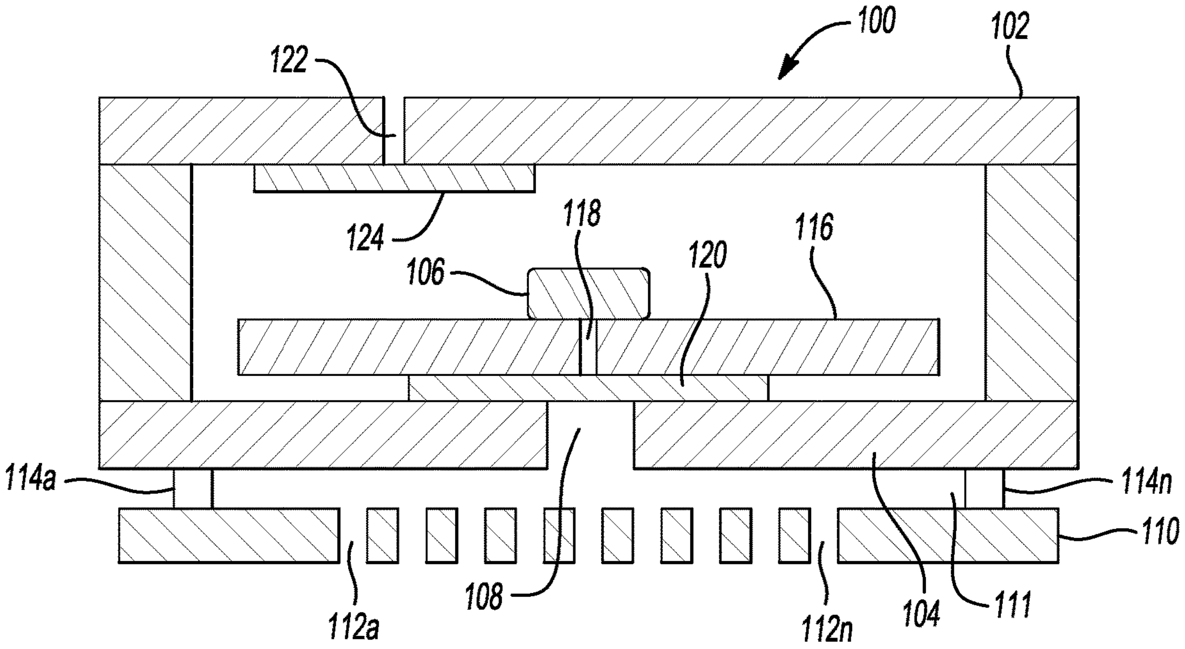
FIG. 1 depicts a cross-sectional view of a first external microphone apparatus in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of a busbar assembly as illustrated in the accompanying figures. Such terms are provided for context and understanding of the embodiments disclosed herein.

Due to the development of autonomous driving in the automotive industry, it has become necessary to detect sounds from the outside (or external environment) of the vehicle (i.e., traffic, pedestrians, emergency sirens, etc.). This may necessitate installing any number of microphones on an exterior of the vehicle. For proper functionality, the microphone has to withstand environmental conditions, such as wind, water, dust, mud, ice, etc. The external microphone apparatus as disclosed herein is generally arranged to withstand such conditions. In addition, the disclosed external microphone apparatus provides, among other things, the ability to enable water entry for purposes of clearing or cleaning debris that collects within or about the apparatus so that the debris is capable of being removed, to maintain acoustic signal quality (i.e., proper acoustic signal detection). These aspects and others will be discussed in more detail below.

The external microphone apparatus as set forth herein may be attached to the bumper or any other externally positioned part of the vehicle. A through hole may be provided in a vehicle body for receiving the external microphone. The microphone apparatus includes an outer grille cover, which is mounted onto the vehicle. In one example, the grille cover includes a first plurality of holes to minimize the amount of wind generated noise seen by the microphone at higher vehicle speeds, while the cover has an overall large opening to enable the sound to pass without any acoustic transformation. A microphone element may be mounted on a printed circuit board (PCB) that is located inside the microphone housing. The opening of the cover may enable the exterior acoustic signal to pass to the microphone element. An acoustic membrane is mounted on the opposite side of the printed circuit board.

An acoustic membrane is mounted on the opposite side of the printed circuit board. The acoustic membrane protects the microphone from water and dust. The acoustic membrane may be arranged to protect the microphone element against a direct jet spray of water. The grille design protects the microphone element against the direct water jet spray. The external microphone apparatus may provide venting to enable liquid to pass therethrough to maintain acoustic functionality. This may be accomplished by providing a gap between the grille and microphone cover. The water and debris may flow through the grille and then be washed away through the gap. The venting membrane as positioned on the microphone element side of the housing may allow for pressure relief due to climatic changes.

FIG. 1 depicts a cross-sectional view of a first external microphone apparatus 100 in accordance to one embodiment. The apparatus 100 generally includes a housing 102, a cover 104, and at least one microphone element 106 (hereafter "the microphone element 106"). The apparatus 100 is generally configured to be mounted to any exterior portion of a vehicle 105. For example, the apparatus 100 may be positioned on a front or rear bumper, any door of the vehicle, side or quarter panel of the vehicle 105, roof of the vehicle 105, hood/liftgate/trunk of the vehicle 105, etc. It is recognized that the portion of the vehicle 105 that houses the apparatus 100 defines a cavity (not shown) that is suitable to receive the apparatus 100. The microphone element 106 is generally configured to detect ambient noise external to the vehicle 105 and to provide the detected ambient noise to any controller (or processor) (not shown) positioned in or about the vehicle 105.

The housing 102 and the cover 104 cooperate with one another to surround the microphone element 106. The cover 104 is generally orientated to face out from, and away from the vehicle 105 into the environment that surrounds the vehicle 105. In one example, the microphone element 106 may be implemented as a Micro-Electro-Mechanical Systems (MEMS) microphone. The cover 104 defines a first opening 108 to enable the microphone element 106 to detect audio external to the vehicle 105. The first opening 108 enables the entry of the acoustic sound without transforming the sound prior to receipt by the microphone element 106. A grille cover 110 is generally positioned in front of the cover 104. In one example, the grille cover 110 may be formed of sheet metal. The grille cover 110 may be axially spaced (or offset) from the cover 104. The grille cover 110 and the cover 104 generally define a gap 111 therebetween. The relevance of the gap 111 will be discussed in more detail below.

The grille cover 110 may or may not extend parallelly with respect to the cover 104. For example, the grille cover 110 may be straight. Alternatively, the grille cover 110 may define at least one plane that extends with a radius with respect to the cover 104. The grille cover 110 defines a plurality of audio holes **112*a*-112*n* to enable audio to enter into the first opening 108 for receipt by the microphone element 106. The diameter for each audio hole 112 may be, for example, 0.5 mm or smaller. The grille cover 110 may include mounting portions 114*a* and 114*b* to couple the grille cover 110 to the cover 104. It is recognized that the cover 104 and the mounting portions 114*a* and 114*b*** may be integrally formed with one another.

A printed circuit board (PCB) 116 supports the microphone element 106 and includes electrical traces and bonds to electrically couple with the microphone element 106. The PCB 116 defines a second opening 118 to enable ambient sound that passes through the plurality of audio holes **112*a*-112*n* and through the first opening 108 to be received by the microphone element 106. An acoustic membrane 120 is positioned between the PCB 116 and the cover 104. The acoustic membrane 120 is generally configured to enable the audio to pass therethrough and into the second opening 118 for receipt by the microphone element 106. In one example, the acoustic membrane 120** may be made of Gore-Tex® or any other suitable material.

The acoustic membrane 120 is configured to serve as a barrier to prevent the entry of debris externally from the vehicle 105 into an interior volume of the housing 102. For example, the acoustic membrane 120 protects the microphone element 106 from water and/or dust or other debris. As shown, the microphone element 106 is positioned on one side of the PCB 116 and the acoustic membrane 120 is positioned on an opposite side of the PCB 116. It is recognized that the acoustic membrane 120 may require protection against a direct spray of water (e.g., water being delivered to the acoustic membrane that exceeds a predetermined pressure amount). Thus, the grille cover 110 is generally configured to prevent or reduce the pressure level of the fluid that is exposed to the acoustic membrane 120.

It is recognized that debris may collect within any one or more of the plurality of audio holes **112*a*-112*n* and/or further within the first opening 108. A user may spray water over the plurality of audio holes 112*a*-112*n* to remove any debris collected therein. Further, the user can spray water over the plurality of audio holes 112*a*-112*n* to remove any debris that collects within the first opening 108. Water (or fluid) and/or debris may drain through an underside of the first opening 108 (e.g., the fluid or debris may flow in a direction into the page of FIG. 1 where the gap 111 is positioned to drain from the apparatus 100**).

The housing 102 defines a third opening 122 on an exterior portion thereof. The third opening 122 is positioned on a side of the housing 102 that is generally positioned within proximity of the microphone element 106. A venting membrane 124 is positioned within a volume defined internally from within the housing 102 and is further positioned directly over or on the third opening 122. The venting membrane 124 provides pressure relief due to climatic or atmospheric changes that are exerted on the vehicle 105.

Figure 2:
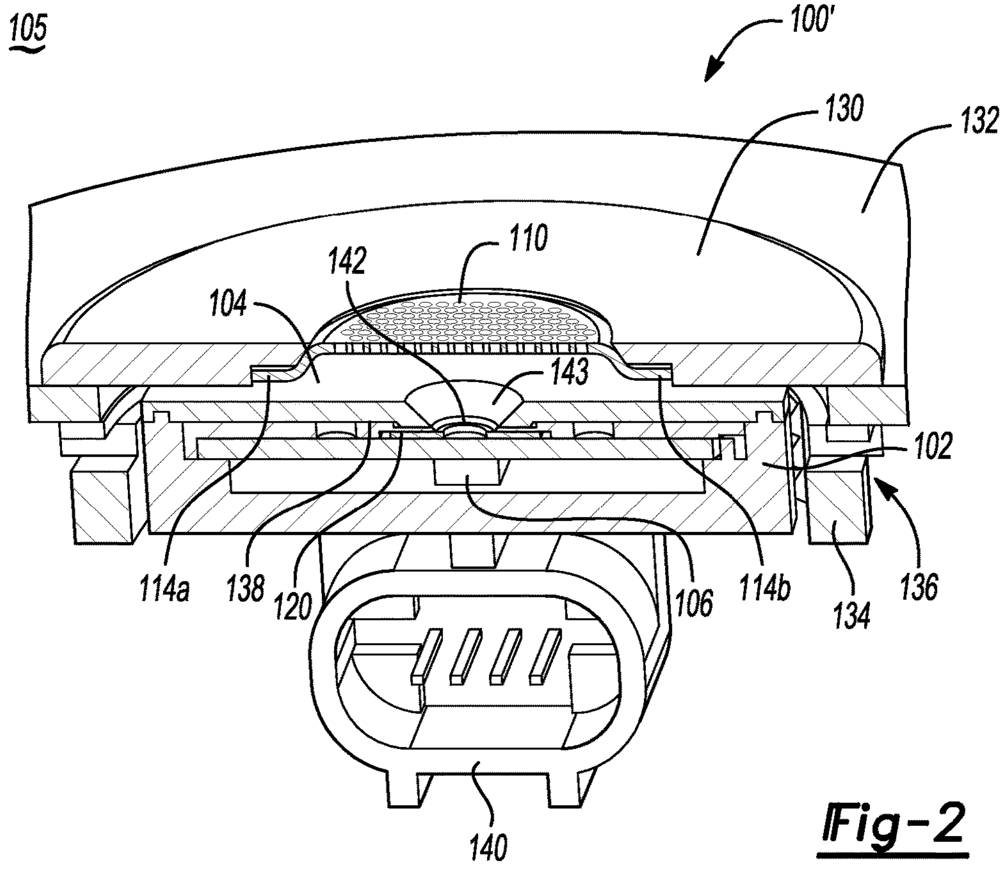
FIG. 2 depicts an elevated view of a second external microphone apparatus in accordance to one embodiment.

FIG. 2 depicts an elevated view of a second external microphone apparatus 100' in accordance to one embodiment. An interfacing ring 130 may be provided and positioned at least over a portion of the grille cover 110. The interfacing ring 130 may lie flush with an exterior portion 132 of the vehicle 105. The interfacing ring 130 may be formed of plastic or other suitable material. As shown, the cover 104 is generally fastened to the housing 102. A fastening holding member 134 is positioned on an underside of the vehicle 105 to couple the apparatus 100' to the vehicle 105 (i.e., to the sheet metal of the vehicle 105). A fastening mechanism 136 is provided to couple the apparatus 100' to the fastening holding member 134. In one example, the fastening mechanism 136 may include a plurality of angled portions and receiving portions that interface with one another to couple the apparatus 100' to the fastening holding member 134. It is recognized that the particular arrangement of the fastening mechanism 136 to couple the apparatus 100' with the fastening holding member 134 may take on any number of different interfacing elements other than the angled and receiving portions noted herein.

A sealing layer 138 may optionally be provided and positioned between the cover 104 and the grille cover 110. In one example, the sealing layer 138 may be formed of foam and shaped in the form of a pad. The sealing layer 138 may prevent vibrations between the apparatus 100 and the vehicle 105. The sealing layer 138 generally defines a fourth opening 142 positioned over the first opening 108, the acoustic membrane 120, and the second opening 118. The fourth opening 142 enables the external sound to pass through the first opening 108, the acoustic membrane 120, the second opening 118, and to the microphone element 106. The cover 104 defines a fifth opening 143 that is positioned over the fourth opening 142. The fifth opening 143 may be shaped in the form of a cone to flatten a frequency response for the audio as captured by the microphone element 106. An audio processor (or audio controller) (not shown) may process with the captured audio from the microphone element 106. The audio processor may process the captured audio without additional computational overhead since the frequency response of the captured audio is flattened. Likewise, due to the cone providing a flattened frequency response, this condition enables the audio processor to receive the captured external audio from the apparatus 100' at a frequency that is similar to the frequency of the audio before such audio is captured by the apparatus 100'. The audio processor may reproduce the external audio and provide an output without having to enhance certain aspects of the captured audio. In one example, a gap may be formed between the grille cover 110 and the sealing layer 138 to enable a user the ability to wash debris that collects within the plurality of the audio holes 112*a*-112*n* away from the apparatus 100'.

A connector assembly 140 is generally positioned on the housing 102 to provide signals indicative of the detected ambient sound external to the vehicle 105 to the audio controller. The audio controller may be configured to perform any number of functions, such as but not limited to, engine sound generation (e.g., for hybrid or electric vehicles), pedestrian warning, emergency vehicle notification, etc.

Figure 3:
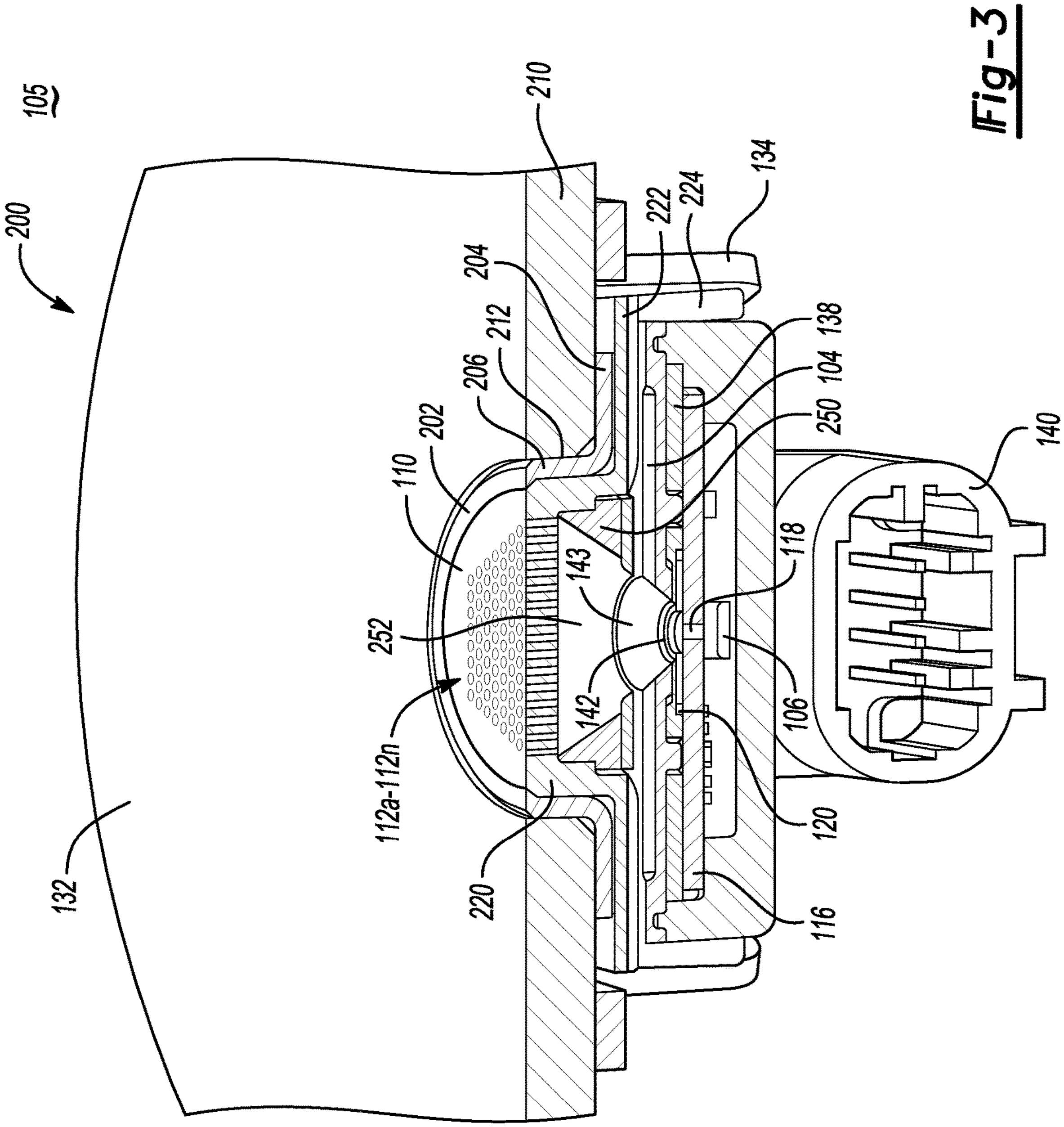
FIG. 3 depicts a cross-sectional view of a third external microphone apparatus in accordance to one embodiment.

FIG. 3 depicts a cross-sectional view of a third external microphone apparatus 200 in accordance to one embodiment. The third external microphone apparatus 200 includes an outer fitting ring 202 that surrounds the grille cover 110. As shown, the outer fitting ring 202 may be used in place of the interfacing ring 130 as illustrated in connection with FIG. 1. The outer fitting ring 202 includes an extending perimeter 204 and a raised wall portion 206. The extending perimeter 204 generally is parallel to the exterior portion 132 of the vehicle 105 and is positioned below the exterior portion 132. The extending perimeter 204 contacts a horizontally extending section 210 of the exterior portion 132 whereas the raised wall portion 206 contacts a vertically extending section 212 of the exterior portion 132. Thus, the extending portion 204 and the raised wall portion 206 form an interface for the apparatus 200 to the exterior portion 132 of the vehicle 105.

Figure 4:
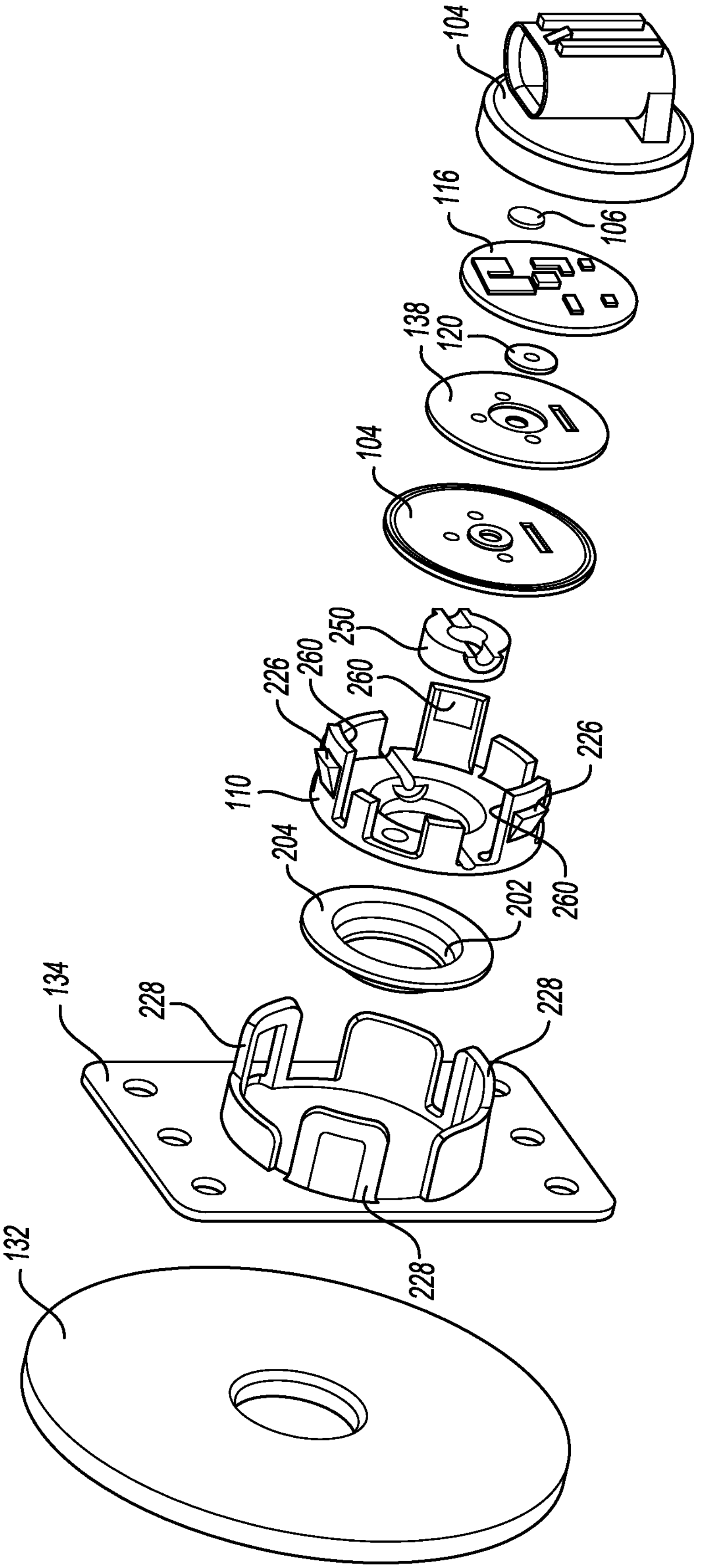
FIG. 4 depicts an exploded view of the second external microphone apparatus in accordance to one embodiment.

The grille cover 110 includes an inner diameter 220 that is surrounded by the raised wall portion 206 of the outer fitting ring 202. The grille cover 110 also includes an extending outer lip 222 that is positioned below the extending perimeter 204 of the outer fitting ring 202. The grille cover 110 also includes a lower flange section 224. The lower flange section 224 generally includes a plurality of flexible locking tabs 226 (see FIG. 4) for locking into locking portions 228 of the fastening holding member 134. The fastening holding member 134 may be generally fixed to the underside of the exterior portion 132 of the vehicle 105 and retains the apparatus 200 to the vehicle 105 when respective locking tabs 226 are received and engaged with the locking portions 228 of the fastening holding member 134.

An inner cap 250 is positioned below the audio holes 112*a*-112*n* of the grille cover 110. The inner cap 250 defines another opening 252 that is shaped in the form of a cone. The opening 254 of the inner cap 250 is positioned over the fifth opening 143 of the cover 104 such that the opening 254 and the fifth opening 143 from a single cone to flatten the frequency response of the audio captured by the microphone element 106. In general, the overall length and final outer diameter of the since cone formed by the fourth opening 142 of the cover 104 and the opening 252 of the inner cap 250 is greater than the overall length and final outer diameter of the fourth opening 142 of the cover 104 of the apparatus 100. Thus, the apparatus 200 may provide an additional flattened frequency response in comparison to that provided by the apparatus 100'. As noted above, due to the cone providing a flattened frequency response, this condition enables the audio processor to receive the captured external audio from the apparatus 200 at a frequency that is representative of the true frequency of the external sound such audio is actually captured by the apparatus 100'. The audio processor may reproduce the external audio and provide an output without having to enhance certain aspects of the captured audio. It is recognized that in the event that apparatus 200 is coupled to an underside of a bumper, the apparatus 200 is generally coupled to a single side of the bumper. This condition improves the overall assembly of the apparatus 200 to the exterior portion 132 of the vehicle 105.

Figure 5:
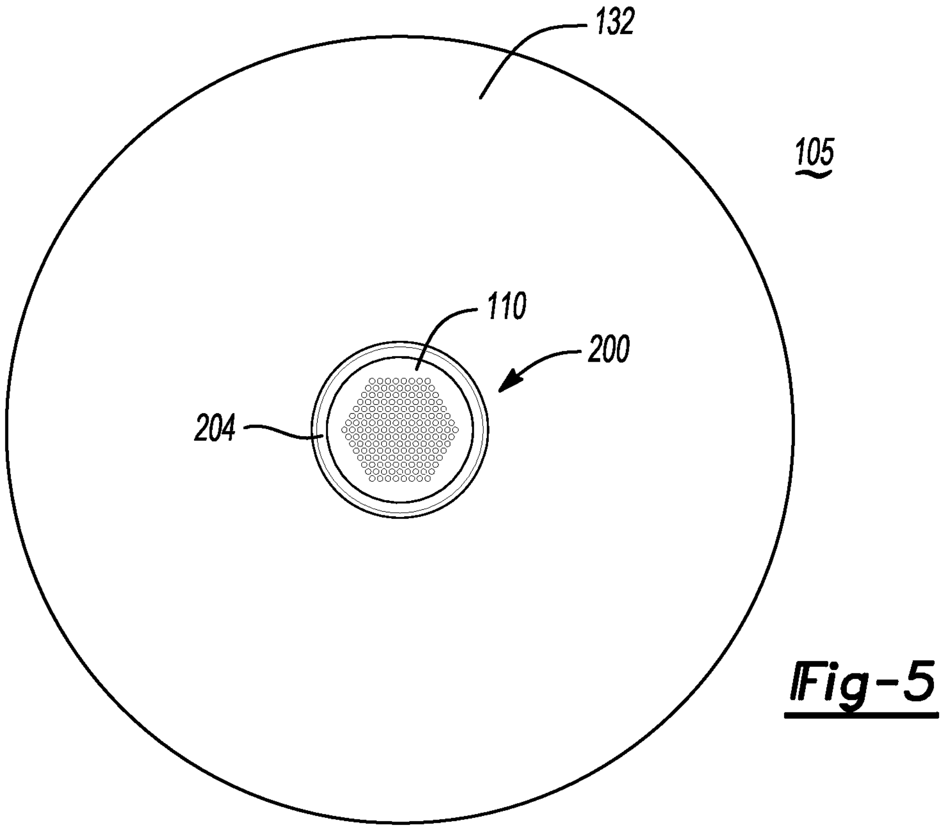
FIG. 5 depicts a top view of an exterior portion of the vehicle including the second external microphone apparatus being positioned thereon in accordance to one embodiment.
Figure 6:
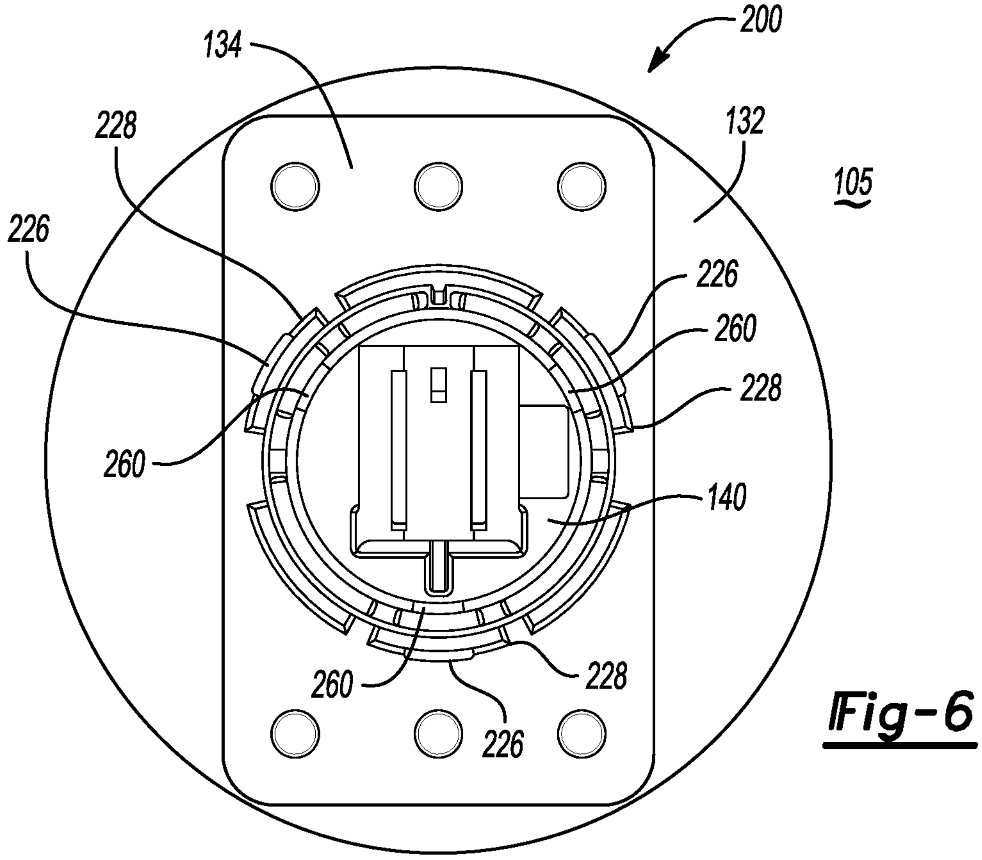
FIG. 6 depicts an underside view of the exterior portion of the vehicle including the second external microphone apparatus as being positioned thereon in accordance to one embodiment.

FIG. 5 depicts a top view of an exterior portion 132 of the vehicle 105 including the second external microphone apparatus 200 being positioned thereon in accordance to one embodiment. FIG. 6 depicts an underside view of the exterior portion 132 of the vehicle 105 including the second external microphone apparatus 200 as being positioned thereon in accordance to one embodiment. As shown, the fastening holding member 134 is attached to the underside of the exterior portion 132 of the vehicle 105. The fastening holding member 134 may be fixed to an underside of the exterior portion 132 of the vehicle 105 via welding, an adhesive, or other suitable fastening mechanism. FIG. 6 also depicts the manner in which the locking portions 228 of the fastening holding member 134 retain corresponding locking tabs 226 of the grille cover 110. As also shown, the grille cover 110 includes locking sections 260 (see also FIG. 5) that are radially spaced about a perimeter of an underside of the grille cover 110. The locking sections 260 engage and retain a lower lip 252 of the connector assembly 140. To assemble the apparatus 200 to the exterior portion 132 of the vehicle 105, the grille cover 110 is inserted over the connector assembly 140 such that the locking sections 260 engage the lower lip 252 of the connector assembly 140 to keep the grille cover 110 coupled to the connector assembly 140. After the locking sections 260 of the grille cover 110 engage the lower lip 252, the locking tabs 226 of the grille cover 110 engage corresponding locking portions 228 of the fastening holding member 134 such that the apparatus 200 is coupled to the exterior portion 132 of the vehicle 105.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone apparatus for attachment to an exterior portion of a vehicle, the apparatus comprising:

a printed circuit board (PCB) defining a PCB opening extending therethrough;

a microphone element supported by the PCB and extending over the PCB opening on a first side of the PCB;

a cover extending over the printed circuit board and defining a first opening to enable ambient sound external to the vehicle to be transmitted to the microphone element;

an acoustic membrane positioned between the first opening of the cover and the PCB, the acoustic membrane covering the PCB opening on a second side of the PCB to enable the ambient sound to pass through the PCB opening to the microphone element;

a grille cover positioned on the exterior portion of the vehicle defining a plurality of openings for directly receiving the ambient sound and for transmitting the ambient sound to the first opening of the cover and to the microphone element;

at least one locking portion configured to attach to an underside of an exterior portion of the vehicle;

wherein the at least one locking portion is further configured to engage at least one locking tab of the grille cover to attach the grille cover to the exterior portion of the vehicle; and a connector assembly to electrically couple the microphone element to an audio controller positioned in the vehicle;

where the grille cover includes a plurality of locking sections that are radially spaced about an underside thereof for engaging a lower lip of the connector assembly.

2. The microphone apparatus of claim 1, wherein the first opening of the cover is cone shaped to reduce a frequency response of the ambient sound.

3. The microphone apparatus of claim 2, further comprising an inner cap that is positioned between the grille cover and the cover.

4. The microphone apparatus of claim 3, wherein the inner cap defines a second opening to enable the ambient sound external to the vehicle to pass therethrough and on to the first opening of the cover.

5. The microphone apparatus of claim 4, wherein the second opening is cone shaped to coact with the cone shaped first opening of the cover to provide a flatter frequency response of the ambient sound.

6. The microphone apparatus of claim 1, wherein the acoustic membrane and the cover are separate from one another.

7. A microphone apparatus for attachment to a vehicle, the apparatus comprising:

a microphone element supported by a printed circuit board (PCB) that defines a PCB opening, the microphone element extending over the PCB opening on a first side of the PCB;

a cover extending over the microphone element and defining a first opening to enable ambient sound external to the vehicle to be transmitted to the microphone element;

an acoustic membrane positioned between the first opening of the cover and the PCB, the acoustic membrane covering the PCB opening on a second side of the PCB to enable the ambient sound to pass through the PCB opening and to the microphone element;

a grille cover positioned on vehicle defining a plurality of openings for directly receiving the ambient sound and for transmitting the ambient sound to the first opening of the cover and to the microphone element;

at least one locking portion configured to attach to an underside of an exterior portion of the vehicle;

wherein the at least one locking portion is further configured to engage at least one locking tab of the grille cover to attach the grille cover to the exterior portion of the vehicle, and a connector assembly to electrically couple the microphone element to an audio controller positioned in the vehicle;

where the grille cover includes a plurality of locking sections that are radially spaced about an underside thereof for engaging a lower lip of the connector assembly.

8. The microphone apparatus of claim 7, wherein the first opening of the cover is cone shaped to reduce a frequency response of the ambient sound.

9. The microphone apparatus of claim 8, further comprising an inner cap that is positioned between the grille cover and the cover.

10. The microphone apparatus of claim 9, wherein the inner cap defines a second opening to enable the ambient sound external to the vehicle to pass therethrough and on to the first opening of the cover.

11. The microphone apparatus of claim 10, wherein the second opening is cone shaped to coact with the cone shaped first opening of the cover to provide a flatter frequency response of the ambient sound.

12. A microphone apparatus comprising:

a microphone element positioned on a printed circuit board (PCB) that defines a PCB opening, the microphone element extending over the PCB opening on a first side of the PCB;

a cover extending over the microphone element and defining a first opening to enable ambient sound external to a vehicle to be transmitted to the microphone element;

an acoustic membrane positioned between the first opening of the cover and the PCB, the acoustic membrane covering the PCB opening on a second side of the PCB to enable the ambient sound to pass therethrough to the microphone element;

a grille cover positioned on a bumper of the vehicle defining a plurality of openings for directly receiving the ambient sound and for transmitting the ambient sound to the first opening of the cover and to the microphone element, at least one locking portion configured to attach to an underside of the vehicle;

wherein the at least one locking portion is further configured to engage at least one locking tab of the grille cover to attach the grille cover to the vehicle, and a connector assembly to electrically couple the microphone element to a controller positioned in the vehicle;

where the grille cover includes a plurality of locking sections that are spaced about an underside thereof for engaging the connector assembly.

* * * * *